UNITED STATES PATENT OFFICE.

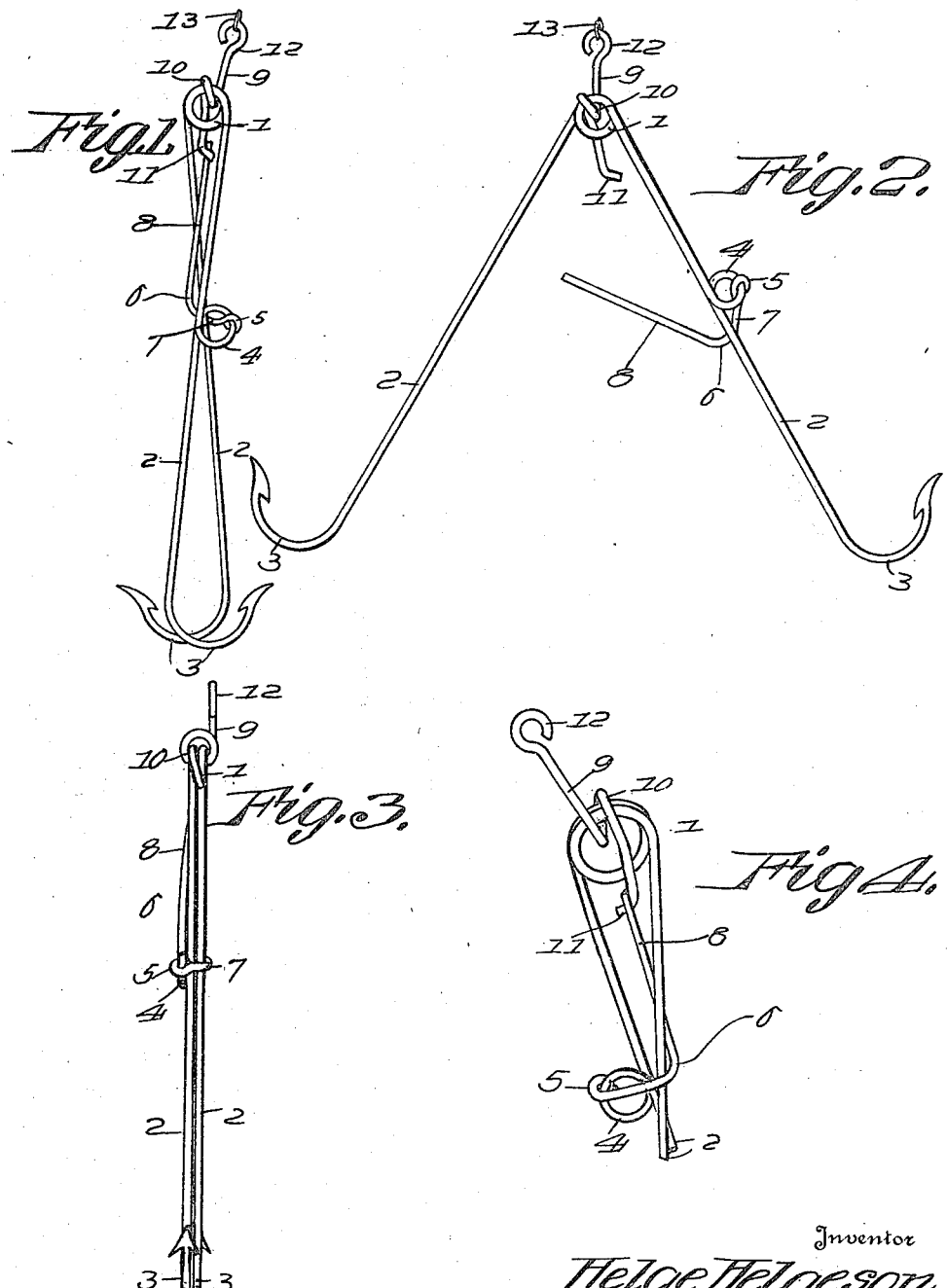

HELGE HELGESON, OF MEDICINE HAT, ALBERTA, CANADA.

FISH-HOOK.

1,283,174.  Specification of Letters Patent.  Patented Oct. 29, 1918.

Application filed March 26, 1918.  Serial No. 224,862.

*To all whom it may concern:*

Be it known that I, HELGE HELGESON, a citizen of the United States of America, residing at Medicine Hat, in the Province of Alberta and Dominion of Canada, have invented new and useful Improvements in Fish-Hooks, of which the following is a specification.

This invention comprehends generally improvements in that class of inventions known as fishing and trapping and more particularly has reference to a spring actuated fish hook.

It is the principal object of this invention to provided a device of the character described wherein the spring actuated hook carrying arms are normally held in close relation with each other so that when a fish bites or swallows the bait on the hooks a pull will be exerted on the arms to release the arms and assure of the spreading thereof, thus causing the hooks to engage the body of the fish and prevent the escape thereof.

More particularly, the present invention embraces the provision of a fish hook of the above mentioned character wherein improved coöperative means are employed in conjunction with the spring actuatable arms for normally and releasably holding the arms in close relation with each other.

It is a more specific object of this invention to provide a device of the above character wherein the trigger is of novel construction being designed for mounting on the coil between the arms and being engageable with the fish line and the locking fingers.

It is an additional object of this invention to provide a device of the above described character which is simple in construction, thoroughly reliable and efficient in its purpose and inexpensive in manufacture.

Other objects will be in part obvious and in part hereinafter set forth.

The invention accordingly consists in the features of construction, the combination of elements and the arrangement of parts which will be exemplified in the construction hereinafter described and the scope of the application of which will be indicated in the appended claims.

The invention is clearly illustrated in the accompanying drawings, in which:—

Figure 1 is a front elevation of the invention showing the arms in a closed position.

Fig. 2 is a front elevation showing the arms in an open position.

Fig. 3 is a side elevation of Fig. 1.

Fig. 4 is a perspective detail view of the invention.

Similar characters of reference are employed in all of the above described views, to indicate corresponding parts.

Referring now, more particularly, to the accompanying drawings, there is employed an improved fish hook consisting of a body which is formed from a single piece of resilient wire bent intermediate its ends to form a spring coil 1. Arms 2 continue from the opposite sides of the coil and terminate at their outer ends in opposed bait carrying hooks 3. The tension of the coil is such as to normally hold the arms and the hooks separated.

With a view toward providing the improved means for holding the arms in close relation with respect to each other one of the arms is bent intermediate its ends to form an eye 4 in which is pivotally and loosely mounted a loop 5 formed on the inner end of a retaining finger 6. This finger is constructed from a single piece of wire and has its inner portion 7 adjacent the loop 5 bent into an arcuate configuration and is designed to embrace the other arm 2 while the extreme outer portion 8 of the finger continues at right angles from the portion 7 and terminates in proximity to the coil 1 when the inner portion 7 embraces one of the arms 2 as indicated in Fig. 1. Coöperating with the outer portion 8 of the finger is the improved trigger 9 which is formed from a single piece of wire and is bent intermediate its ends to form an eye 10 which is pivotally and loosely engaged in the coil 1. The outer end of the trigger is bent to form a catch 11 which is engaged about the outer portion of the finger subsequent to engaging the finger about the arms as indicated in Fig. 1. The opposite end of the trigger terminates in a loop 12 designed for receiving the lower end of a fish line 13.

In use, assuming that the parts have been assembled in the manner described, when a fish bites the bait on the hooks 3 a pull will be exerted on the arms 2 and inasmuch as the line 13 serves to support the trigger, the pull will be exerted on the arms in such a manner that the trigger will swing about its pivots in the coil 1 and release the outer end of the trigger to consequently permit the arms to spread so that the hooks will engage the body of the fish thereby preventing the latter from escaping.

As many changes could be made in the above construction and many apparently widely different embodiments of this invention could be made without departing from the scope thereof and it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention which as a matter of language might be said to fall therebetween.

Having thus fully described this invention, what is claimed as new and desired to be secured by Letters-Patent is:—

1. A device of the character described including a body formed from a single strand of wire bent intermediate its ends to form a coil, spreading arms continuing from the coil, opposed hooks on the outer ends of the arms, a finger loosely connected to one of the arms and embracing the other arm, and a trigger pivotally mounted in the coil and engageable with the outer end of the finger for removably holding the arms in close relation with respect to each other.

2. A fish hook including a body formed from a single strand of wire bent intermediate its ends to form a coil, spreading arms continuing from the coil, opposed bait carrying hooks on the outer ends of the arms, an eye formed in one of the arms, a finger having its end loosely and pivotally mounted in the eye and its inner portion curved so as to embrace the other arm, the extreme outer portion of the trigger being arranged at an angle to the longer portion and terminating in proximity to the coil when the inner portion is engaged on both the arms, and a trigger pivotally mounted in the coil and adapted to be connected to a fish line and engageable at its outer end with the finger so as to removably prevent the arms from spreading yet being adapted to release the arms when a pull is exerted on one of the arms.

3. A fish hook comprising a body formed from a single strand of wire bent intermediate its ends to form a coil, spreading arms continuing from the coil, opposed bait carrying hooks on the outer ends of the arms, an eye formed intermediate the ends of one of the arms, a finger formed with a loop on its inner end for pivotal engagement with the eye, the inner portion of the finger being curved so as to embrace the other arm, the outer portion of the finger continuing at an angle from the inner portion and terminating in proximity to the coil, a trigger formed from a single piece of wire bent intermediate its ends to form an eye pivotally engageable in the coil, a catch formed on one end of the trigger and designed for releasably holding the outer end of the outer portion of the finger, and a fish line engaging loop on the opposite end of the trigger.

In testimony whereof I affix my signature.

HELGE HELGESON.

Copies of this patent may be obtained for five cents each, by addressing the "Commissioner of Patents, Washington, D. C."